United States Patent
Cox et al.

(10) Patent No.: US 6,926,994 B2
(45) Date of Patent: Aug. 9, 2005

(54) DEVICE WITH DETACHABLE BATTERY MOUNTING

(75) Inventors: Allen R. Cox, Eastleigh (GB); David Mark Lee, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/634,479

(22) Filed: Aug. 4, 2003

(65) Prior Publication Data

US 2004/0026587 A1 Feb. 12, 2004

(30) Foreign Application Priority Data

Aug. 6, 2002 (GB) .............................................. 0218206

(51) Int. Cl.[7] .............................................. H01M 2/10
(52) U.S. Cl. .......................................................... 429/99
(58) Field of Search .............................. 429/9, 96–100, 429/123

(56) References Cited

U.S. PATENT DOCUMENTS

| | | | | |
|---|---|---|---|---|
| 5,573,870 A | * | 11/1996 | Andrews ...................... | 429/96 |
| 5,631,101 A | * | 5/1997 | Amero, Jr. .................... | 429/90 |
| 5,707,249 A | * | 1/1998 | Byrd .......................... | 439/500 |
| 5,935,729 A | * | 8/1999 | Mareno et al. ............. | 429/100 |
| 5,943,498 A | * | 8/1999 | Yano et al. .................. | 717/128 |

OTHER PUBLICATIONS

The American Heritage Dictionary of the English Language. 1992. Houghton Mifflin Company. Third Edition. clamp.*
Hwang, Y.N., Hong, J.S., Lee, S.H., Ahn, S.J., Jeong, G.T., Koh, G.H., Kim, H.J., Jeong, W.C., Lee, S.Y., Park, J.H., Ryoo, K.C.., Horii, H., Ha, Y.H., Yi, J.H., Cho, W.Y., Kim, Y.T., Lee, K.H., Joo, S.H., Park, S.O., Jeong, U.I., Jeong, H.S. and Kim, Kinam, "Completely CMOS–Compatible Phase–Change Nonvolatile RAM Using NMOS Cell Transistors," presented at 2003 19th IEEE Non–Volatile Semiconductor Memory Workshop, Monterey, California, Feb. 26–20, 2003.
Ha, Y.H., Yi, J.H., Horii, H., Park, J.H., Joo, S.H., Park, S.O., Chung, U–In and Moon, J.T., "An Edge Contact Type Cell for Phase Change RAM Featuring Very Low Power Consumption," presented at IEEE 2003 Symposium on VLSI Technology, Kyoto, Japan, Jun. 12–14, 2003.

(Continued)

Primary Examiner—Patrick Joseph Ryan
Assistant Examiner—Melissa Austin
(74) Attorney, Agent, or Firm—Randall J. Bluestone; Harrington & Smith, LLP

(57) ABSTRACT

A battery mounting (100) is provided for detachable placement in a device. The battery mounting (100) comprises a housing (104) for at least one battery cell (102), a clip (116) having a cammed surface (118) for cooperation with between the housing (104) and a portion of the device, a lock (130) with a-means for applying a force to the chip (116) for locking the battery mounting (100) in place in the device, and at least one power contact (138, 140) for connecting the at least one battery cell (102) to the device. The lock (138) provides a load in the engaging direction of the at least one power contact (138, 140).

20 Claims, 2 Drawing Sheets

OTHER PUBLICATIONS

Hwang, Y.N., Hong, J.S., Lee, S.H., Ahn, S.J., Jeong, G.T., Koh, G.H., Oh, J.H., Kim, H.J., Jeong, W.C., Lee, S.Y., Park, J.H., Ryoo, K.C., Horii, H., Ha, Y.H., Yi, J.H., Cho, W.Y., Kim, Y.T., Lee, K.H., Joo, S.H., Park, S.O., Chung, U.I., Jeong, H.S. and Kim, Kinam, "Full Integration and Reliability Evaluation of Phase–change RAM Based on 0.24 mm–CMOS Technologies," presented at IEEE 2003 Symposium on VlSI Technology, Kyoto, Japan, Jun. 12–14, 2003.

Horii, H., Yi, J.H., Park, J.H., Ha, Y.H., Baek, I.G., Park, S.O., Hwang, Y.N., Lee, S.H., Kim, Y.T., Lee, K.H., Chung, I–In and Moon, J.T., "A Novel Cell Technology Using N–doped GeSbTe Films for Phase Change RAM," presented at IEEE 2003 Symposium on VLSI Technology, Kyoto, Japan, Jun. 12–14, 2003.

* cited by examiner

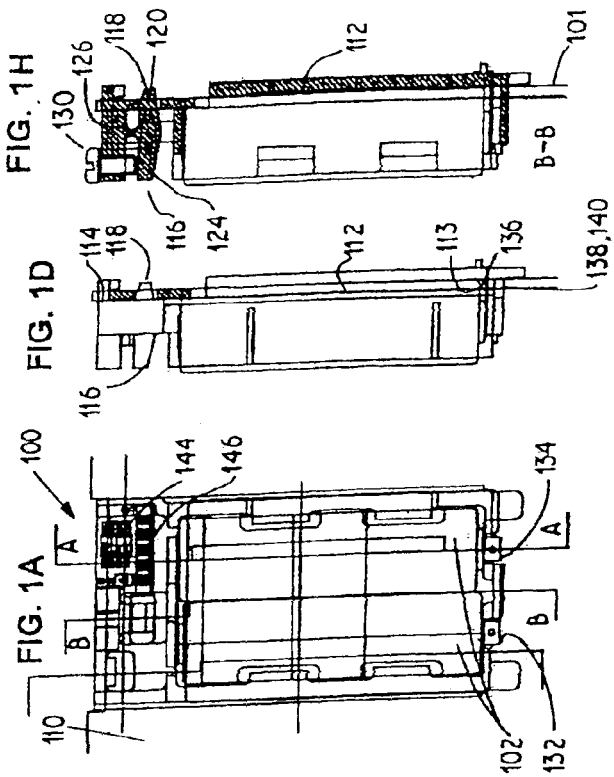

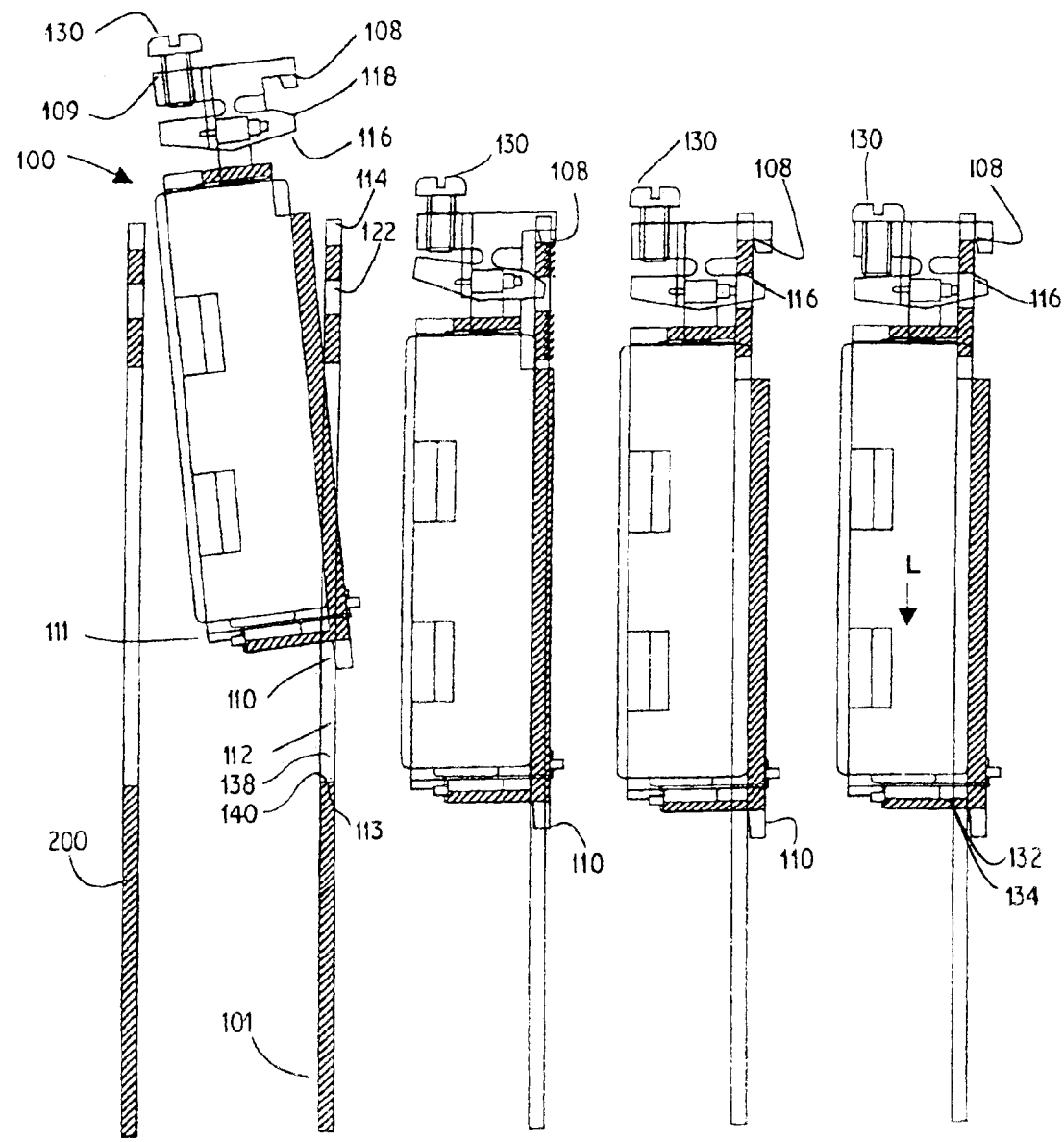

DEVICE WITH DETACHABLE BATTERY MOUNTING

CLAIM OF FOREIGN PRIORITY

This application is filed with a claim of priority under 35 U.S.C. §119(a) to foreign application Serial No. 0218206.1, filed in the United Kingdom on 6 Aug. 2002, and entitled "Device, with Detachable Battery Mounting."

FIELD OF THE INVENTION

This invention relates to the field of battery mountings for housing batteries in position in devices. In particular, the invention relates to replacement battery packs for example for use in data storage adapters.

BACKGROUND OF THE INVENTION

Batteries are required to provide power in a large range of situations and environments. An example of a need for batteries is in storage PCI (peripheral component interface) adapters.

The use of batteries in a storage PCI adapter such as a RAID adapter is used as an example throughout this documents, although it should be understood that this is one example of battery installation and the described apparatus and method are applicable to a wide range of installations and uses wherever battery power is needed in an environment with limited space. Other applications may include, for example, telecommunications adapters and any other battery powered installation.

The described apparatus and method are also applicable to situations in which battery backup is required in an otherwise mains powered system.

In storage PCI adapters, as in a large number of other environments, batteries have a shorter service life than the products they are in and so require replacement in the field. If this replacement requires the removal of the adapter then the service action can be very disruptive.

Also the space available for mounting batteries in storage PCI adapters as in many other situations is very limited. Storage PCI adapters have form factors that must be met which dictate the dimensions of the adapter. The use of small sized batteries enables the batteries to fit in the installation; however, the batteries must be replaced more often than a larger size of battery.

In prior art battery installations, the batteries are held in place by spring clips and power leads are attached to the battery connectors. This has the disadvantage that the clips are not locked in place and if a spring fails, the battery may become dislodged. Furthermore, the connection leads are vulnerable to dislodgment or damage as they are external to the installation.

SUMMARY OF THE INVENTION

According to a first aspect of the present invention there is provided a battery mounting for detachable placement in a device, the battery mounting comprising: a housing for one or more battery cells; a clip having a cammed surface for cooperation with a portion of the device; a lock with a means for applying a force to the clip for locking the battery mounting in place in the device; and at least one power contact for connecting the battery cells to the device; wherein the lock provides a load in the engaging direction of the contacts.

The lock may be a screw or a clamp applied to the clip.

Preferably, the clip deflects to allow mounting in the device and the cammed surface acts with the portion of the device to urge the battery mounting into the correct mounted position relative to the device. The clip may be a protrusion with a central support between a first end and a second end of the protrusion, the first end having the cammed surface and engaging the portion of the device. The lock may act on the second end of the protrusion and the protrusion may be deflectable about the central support.

The battery mounting may be mounted slidably within an opening in the device and the battery mounting may have hook means at ends of the battery mounting for location through openings in the device.

The housing and clip may be formed of a one piece plastic moulding.

The battery mounting may have a logic means with sprung logic contacts for connecting to corresponding contacts on the device. The logic means may be a printed circuit board containing data about the battery cells.

According to a second aspect of the present invention there is provided a device with a detachable battery mounting, the device comprising: a board with an opening in which the battery mounting is placeable; at least one power contact disposed on the cross-section of the board within the opening; and the battery mounting comprising: a housing for one or more battery cells; a clip having a cammed surface for cooperation with a portion of the board; a lock with a means for applying a force to the clip for locking the battery mounting in place in the opening; and at least one power contact for connecting the battery cells to the at least one power contact on the board; wherein the lock provides a load in the engaging direction of the contacts.

The lock may be a screw or a clamp applied to the clip.

Preferably, the clip may deflect to allow mounting in an aperture of the device and the cammed surface may act with the aperture in the device to urge the battery mounting into the correct mounted position relative to the device. The clip may be a protrusion with a central support between a first end and a second end of the protrusion, the first end having the cammed surface and engaging the aperture in the device. The lock may act on the second end of the protrusion and the protrusion may be deflectable about the central support.

The battery mounting may be mounted slidably within the opening in the device and the battery mounting may have hook means at ends of the battery mounting for location through openings in the device.

The battery mounting when inserted in place may be recessed within the opening of the board.

The housing and clip may be formed of a one-piece plastic moulding.

The battery mounting may have a logic means with sprung logic contacts for connecting to corresponding contacts on the device. The logic means may be a printed circuit board containing data about the battery cells.

The board may be a printed circuit board and the device may be a storage PCI adapter.

According to a third aspect of the present invention there is provided a method of inserting a battery mounting in a device, comprising: slidably engaging the battery mounting within an opening in the device; engaging hook means on the battery mounting with openings in the device; engaging a clip with a cammed surface in an aperture of the device; the cammed surface urging the battery mounting into the correct mounted position relative to the device; locking the battery mounting relative to the device with a locking means applying a force to the clip; the step of locking loading power contacts for connecting the battery cells to the device in the engaging direction of the contacts.

The present invention provides for a battery mounting which can be removed from an installation in a device without disrupting the operation of the device. The present invention also provides for a battery mounting that maximises the space available for batteries thereby enabling larger batteries to be used in an installation. Further, the present invention provides for a battery mounting in which the battery mounting has robust contacts and can withstand shocks and vibrations.

BRIEF DESCRIPTION OF THE DRAWINGS

An embodiment of the present invention will now be described, by way of an example only, with reference to the accompanying drawings in which:

FIG. 1A is a plan view of a battery mounting in position in a device in accordance with the present invention;

FIG. 1B is an underneath plan of the battery mounting of FIG. 1A not in position in a device;

FIG. 1C is a left side elevation of the battery mounting of FIG. 1A not in position in a device;

FIG. 1D is a right side elevation of the battery mounting of FIG. 1A;

FIG. 1E is a top end elevation of the battery mounting of FIG. 1A not in position in a device;

FIG. 1F is a bottom end elevation of the battery mounting of FIG. 1A;

FIG. 1G is a longitudinal cross-section through line A—A of FIG. 1A with the device not shown;

FIG. 1H is a longitudinal cross-section through line B—B of FIG. 1A;

FIG. 1I is a cross-section of FIG. 1A with the device not shown;

FIG. 1J is a cross-section of FIG. 1A with the device not shown; and

FIGS. 2A to 2D are longitudinal cross-sectional views of a battery mounting in accordance with the present invention in various stages of insertion into a device.

DETAILED DESCRIPTION OF THE INVENTION

Referring to FIGS. 1A to 1J, a battery mounting 100 is shown. In FIGS. 1A, 1D, 1H and 1F the board 101 of a device in which the battery mounting 100 is place is shown as well as battery cells 102.

The battery mounting 100 has a housing 104 for the battery cells 102. In this example, the housing 104 accommodates two battery cells 102. It will be appreciated that the housing 104 could be designed to accommodate only one battery cell or more than two battery cells of various dimensions to suit particular applications or environments.

In the described embodiment, the battery mounting 100 holds two AA battery cells 102 and is suitable for placement in a printed circuit board 101 of a storage PCI adapter. This is one example of an embodiment of a battery mounting the described features of which can equally be applied with different dimensions and in different environments.

The housing 104 has supports 106 for engaging the battery cells 102 and holding the cells 102 in position in the housing 104. The housing 104 is formed of a moulded plastics material and the supports 106 can be sufficiently flexible to allow the battery cells 102 to be inserted and to hold the cells 102 in place.

The battery mounting 100 also has two sets of hook means 108, 110. One of the sets of hook means 108 is at the top end 109 of the battery mounting 100 and the other set of hook means 110 is at the bottom end 111 of the battery mounting 100. The hook means 108, 110 locate the battery mounting 100 in the board 101 of the device.

The board 101 has a primary opening 112 in which the housing 104 of the battery mounting 100 is recessed when the battery mounting is placed in the board 101. The set of hook means 110 at the bottom end 111 of the battery mounting 100 engage a bottom edge 113 of the primary opening 112 such that a portion of the housing 104 protrudes through the primary opening 112.

The board 101 has a second opening 114 or, if the battery mounting 100 is to be adjacent an edge of the board 101, a recess in the edge of the board 101 in which the set of hook means 108 at the top end of the battery mounting 100 engage.

The battery mounting 100 has a clip 116 with a cammed surface 118 which provides a positive clipping action to hold the battery mounting 100 in place in the primary opening 112 in the board 101 of the device. The clip 116, housing 104 and hook means 108, 110 are all moulded as a one-piece plastic moulding. The clip 116 makes use of the spring characteristics of the moulded materials.

The clip 116 has a first end 120 which, in use, projects through a further clip opening 122 in the board 101. The clip 116 has a second end 124 opposite the first end 120. There is provided a central support 126 which supports the clip 116 between the first and second ends 120, 124. The cammed surface 118 is provided on a top surface of the first end 120.

When the battery mounting 100 is inserted into the board 101, the first end 120 or the clip 116 is inserted through the clip opening 122. The cammed surface 118 of the clip 116 acts against one of the surfaces of the clip opening 122 until the battery mounting 100 is fully inserted and the clip 116 positively engages as the cammed surface 118 ends.

The central support 126 is flexible to the extent that it allows the clip 116 to be deflected as the cammed surface 118 engages the surface of the clip opening 122. The first and second ends 120, 124 of the clip 116 are maintained in rigid alignment with each other.

A screw or clamp means 130 is provided on the battery mounting 100 which can be tightened to exert a force on the second end 124 of the clip 116. This force pushes the second end 124 of the clip 116 away from the screw or clamp means 130. The central support 126 acts as a fulcrum and the second and first ends 124, 120 of the clip 116 pivot in opposite directions as the force is applied. This means that the first end 120 of the clip 116 is forced upwards and the cammed surface 118 is forced against the surface of the clip opening 122.

As the cammed surface 118 is positioned tightly against the surface of the clip opening 122, the force is transmitted through the length of the battery mounting 100 and forces the bottom end 111 of the battery mounting 100 against the bottom edge 113 of the primary opening 112.

The housing 104 has power contacts 132, 134 disposed within the housing 104 on the bottom housing wall 136 against which the contacts of the battery cells 102 are placed. The power contacts 132, 134 extend through the housing wall 136 to the exterior of the battery mounting 100.

Corresponding power contacts 138, 140 are provided on the board 101 of the device. The power contacts 138, 140 are provided on the bottom edge 113 of the primary opening 112 in the board. The board has a thickness and the contacts 138, 140 are disposed within the thickness or cross-section of the bottom edge 113 of the primary opening 112. In the example of the PCI adapter, the board 101 is a printed circuit board of thickness 1.6 mm.

Therefore, when the screw or clamp means 130 exerts a force through the length of the battery mounting 100, the power contacts 132, 134 on the battery mounting 100 are forced into firm contact with the power contacts 138, 140 on the board 101. The power contacts 132, 134, 138, 140 may be current carrying gold contacts.

The battery mounting 100 also has logic means 144 in the form of a printed circuit card 144 containing an electronically stored VPD (vital product data) for managing the logic data of the battery cells 102.

VPD is data which describes aspects of the product, e.g. part number, serial number. This is held in a small Serial EEPROM (electrically erasable programmable ROM). The EEPROM can also be used to maintain attributes about the battery, such as current charge state, lifetime, power-on-hours, expected discharge characteristics, etc. These attributes can be used in conjunction with a program running on the PCI card to determine how to manage the battery, and how it will perform in use. The data can be maintained by the PCI card such that if the battery is swapped to another card, all data about the particular battery unit is kept with it.

The logic means 144 has logic contacts 146 on the battery mounting 100 which are sprung pogo contacts which correspond to contacts on the board 101. The logic contacts 146 on the battery mounting 100 are loaded to the required position by the operation of the clip 116 and the screw or clamp means 130.

Referring now to FIGS. 2A to 2D, a battery mounting 100 is shown in sequential positions as it is inserted into the board 101 of a device. In FIG. 2A, the battery mounting 100 is inserted by sliding vertically between the board 101 of a device in which the battery mounting 100 is to be placed and a board 200 of an adjacent device.

The sliding action of inserting the battery mounting 100 enables the battery mounting 100 to be inserted into a board 101 in a device in situ without removing the board 101 from the device and enabling the battery mounting 100 to be replaced in the field.

The board 101 in the device into which the battery mounting 100 is to be inserted is shown in FIG. 2A to have a primary opening 112 into which the battery mounting 100 will be recessed, a clip opening 122 and a recess 114.

As shown in FIGS. 2B to 2D, the battery mounting 100 is slid into position and the hook means 110 on the bottom end 111 of the battery mounting 100 are hooked through the primary opening 112 and engage the bottom edge 113 of the primary opening 112. The hook means 108 at the top end 109 of the battery mounting 100 hook over the edge of the recess 114. In this way, the battery mounting is hooked in place in a recessed position with the housing 104 recessed into the board 101 as shown in FIG. 2C.

The clip 116 is then fully engaged into the clip opening 122 and the cammed surface 118 of the clip 116 acts against the top edge of the clip opening 122. The spring characteristics of the moulded materials allow the battery mounting 100 to snap into position. The screw or clamp means 130 is then tightened as shown in FIG. 2D to lock the clip 116 and to exert a force onto the second end 124 of the clip 116 thereby loading the battery mounting 100 in a direction "L" shown in FIG. 2D which firmly engages the power contacts 132, 134 on the battery mounting 100 with the power contacts 138, 140 on the bottom edge 113 of the primary opening 112 in the board 101.

The described arrangement of a battery mounting allows printed circuit boards of devices to remain in place during the replacing of battery cells. For example, in the case of a PCI adapter the adapter can remain powered on whilst the battery mounting is removed and the battery cells replaced without disrupting the operation of the adapter.

The described arrangement of a battery mounting in a board of a device maximises the battery size that can be inserted into a location in a device within the form factor allowance of the device. In the described example, the form factor allowance on both sides of the board as well as the width of the board itself is used.

The provision of power contacts on the edge of the opening of the board of the device allows a high area contact with a loading in the position direction provided by the locking means in the described form of a screw or clamp means. Furthermore, the positioning of the power contacts on the edge of the opening of the board reduces the area needed on the surface of the board.

The locking means in the described form of a screw of clamp means ensures that the assembled device with the battery mounting is shock and vibration proof by preventing the power contacts and the logic contacts from becoming disconnected or the battery mounting being dislodged from the device.

Improvements and modifications can be made to the foregoing without departing from the scope of the present invention.

What is claimed is:

1. A battery mounting for detachable placement in a device, the battery mounting comprising:
    a housing for at least one battery cell;
    a clip having a cammed surface for providing cooperation between the housing and a portion of the device;
    a lock for applying a force to the clip for locking the battery mounting in place in the device; wherein the lock comprises one of a screw and a clamp applied to the clip; and
    at least one power contact for connecting the at least one battery cell to the device; wherein the lock provides a load in the engaging direction of the at least one power contact.

2. A battery mounting as claimed in claim 1, wherein the clip deflects to allow mounting in the device and the cammed surface acts with the portion of the device to urge the battery mounting into the correct mounted position relative to the device.

3. A battery mounting as claimed in claim 1, wherein the clip comprises a protrusion with a central support between a first end and a second end of the protrusion, the first end has the cammed surface and engages the portion of the device, the lock acts on the second end of the protrusion, the protrusion is deflectable about the central support.

4. A battery mounting as claimed in claim 1, wherein the battery mounting is adapted for mounting slidably within an opening in the device and the battery mounting has at least one hook at each of a bottom end and a top end of the battery mounting for hooking through openings in the device.

5. A battery mounting as claimed in claim 1, wherein the housing and the clip are formed of a one piece plastic moulding.

6. A battery mounting as claimed in claim 1, wherein the battery mounting comprises a logic device with sprung logic contacts for connecting to corresponding power contacts on the device.

7. A battery mounting as claimed in claim 6, wherein the logic device comprises a printed circuit board containing data about the at least one battery cell.

8. A device with a detachable battery mounting, the device comprising:

- a board with an opening in which the battery mounting is detachably mounted;
- at least one power contact disposed on the cross-section of the board within the opening; and
- the battery mounting comprising:
- a housing for at least one battery cell;
- a clip having a cammed surface for providing cooperation between the housing and a portion of the board;
- a lock applying a force to the clip for locking the battery mounting in place in the opening; wherein the lock comprises one of a screw and a clamp applied to the clip; and
- at least one power contact connecting the at least one battery cell to the at least one power contact on the board; wherein the lock provides a load in the engaging direction of the at least one power contact.

9. A device as claimed in claim 8, wherein the clip deflects to allow mounting in an aperture of the device and the cammed surface acts with the aperture in the device to urge the battery mounting into the correct mounted position relative to the device.

10. A device as claimed in claim 8, wherein the clip is a protrusion with a central support between a first end and a second end of the protrusion, the first end has the cammed surface and engages an aperture in the device, the lock acts on the second end of the protrusion, the protrusion is deflectable about the central support.

11. A device as claimed in claim 8, wherein the battery mounting is detachably mounted slidably within the opening in the device and the battery mounting has at least one hook at each of a bottom end and a top end of the battery mounting for location through openings in the device.

12. A device as claimed in claim 8, wherein the battery mounting is recessed within the opening of the board.

13. A device as claimed in claim 8, wherein the housing and the clip are formed of a one-piece plastic moulding.

14. A device as claimed in claim 8, wherein the battery mounting comprises a logic device with sprung logic contacts for connecting to corresponding contacts on the device.

15. A device as claimed in claim 14, wherein the logic device comprises a printed circuit board containing data about the at least one battery cell.

16. A device as claimed in claim 8, wherein the board comprises a printed circuit board.

17. A device as claimed in claim 8, wherein the device comprises a storage peripheral component interface (PCI) adapter.

18. A battery mounting for detachable placement in a device, the battery mounting comprising:

- means for housing at least one battery cell;
- means for providing engagement between the means for housing and a portion of the device;
- means for applying a force to the means for providing engagement for locking the battery mounting in place in the device; and
- at least one power contact for connecting the at least one battery cell to the device; wherein the means for applying force provides a load in an engaging direction of the at least one power contact.

19. A battery mounting claim 18, further comprising logic means for monitoring battery information.

20. A battery mounting as in claim 19, wherein the battery information comprises at least one of: current charge state, lifetime, power-on-hours, and expected discharge characteristics.

* * * * *